July 18, 1961 L. W. ELLIS, JR 2,992,876

DATA INDICATOR SYSTEM

Filed Oct. 9, 1957 2 Sheets-Sheet 1

Inventor
LYNN W. ELLIS, JR.
By Philip M. Bolton
Attorney

*Inventor*
LYNN W. ELLIS, JR.
*By* Philip M. Bolton
*Attorney*

2,992,876
Patented July 18, 1961

2,992,876

DATA INDICATOR SYSTEM

Lynn W. Ellis, Jr., Madrid, Spain, assignor to International Telephone and Telegraph Corporation, Nutley, N.J., a corporation of Maryland Filed Oct. 9, 1957, Ser. No. 722,110
5 Claims. (Cl. 346—110)

This invention relates to a data processing arrangement in which energy, whose position as measured according to one or both coordinates of a given coordinate system expresses certain information, is directed to a second position in which the same information is expressed according to measurements of one or both coordinates of a different coordinate system. More particularly, the present invention relates to such an arrangement in which the coordinate systems are polar and Cartesian with at least the polar angle of the polar system and the X or Y coordinate of the Cartesian system containing this same information. In one specific form, the present invention relates to the rectilinear recording of radial information, as, for example, recording indications appearing on a cathode-ray tube face.

Many uses exist and many more uses will undoubtedly be found for arrangements for translating information expressed in terms of one system of coordinates into a second system of coordinates. For example, there have been devices and schemes developed in the past for recording varying radial displays such as those used in connection with direction finding equipment. These schemes in general have provided a picture taking device, such as a camera, which continually took pictures of the radial display which appeared on the face of a cathode-ray tube. It is immediately apparent that these schemes had to provide some synchronization between the speed of the film and the rate at which the radial display varied. Since the rate of speed of the variations of the radial display was very often inconsistent and, secondly, was very often at an extremely high speed, the methods using camera techniques proved to be unsatisfactory for many operations.

Even if the foregoing difficulty did not exist or could be made negligible, for example, where the variations of the radial display were relatively slow, still the actual form of the recording was not only awkward for visual interpretation, but the reading of this data by non-visual means for further data processing was most difficult. It will be seen, however, particularly from the following discussion, that if this radially arranged data were changed into rectilinearly arranged data when recorded, both the visual reading of the recorded data as well as subsequent processing thereof are greatly facilitated.

An object of the present invention is the provision of an arrangement for translating energy from one system of coordinates to another, and particularly for such translation between polar and Cartesian coordinates.

Another object of the present invention is to provide a system for recording information which appears in a form characterized by a first coordinate system in a second form characterized by a second coordinate system.

A further object of this invention is the provision of an improved system for recording varying radial displays.

A still further object of the present invention is the provision of a system for recording varying radial displays which is not limited by the speed of the recording medium nor the speed of the variations of the radial display.

In accordance with a main feature of the present invention, the radially arranged information energy which appears, for instance, as lines or dots is transformed into an arrangement of substantially parallel lines or rows of dots, whose lateral deflection from a given reference position is proportional to the radian angle that the corresponding radially arranged information lies from an equivalent reference position of said radial arrangement.

In accordance with another feature of the present invention there is provided a reflecting means, such as a right circular cylinder prism with a right circular cone cut therefrom or a right circular cone reflection mirror, which reflects the incident energy thereto in a plane which forms the same angle with the center point of the radial display as did the particular bit of the display which the incident energy represents.

According to a still further feature it is provided that this reflected energy fall on an energy sensitive film thereby recording the particular bit of information in the form of a straight line or a dot, whose lateral deflection from a reference position on the film represents the angle that the particular bit of information formed with the equivalent reference point on the radial display.

The foregoing and other objects and features of this invention and the manner of attaining them will become more apparent and the invention itself will be best understood by reference to the following description of embodiments of the invention taken in conjunction with the accompanying drawings comprising FIGS. 1, 2, 3 and 4, wherein.

Figure 1:
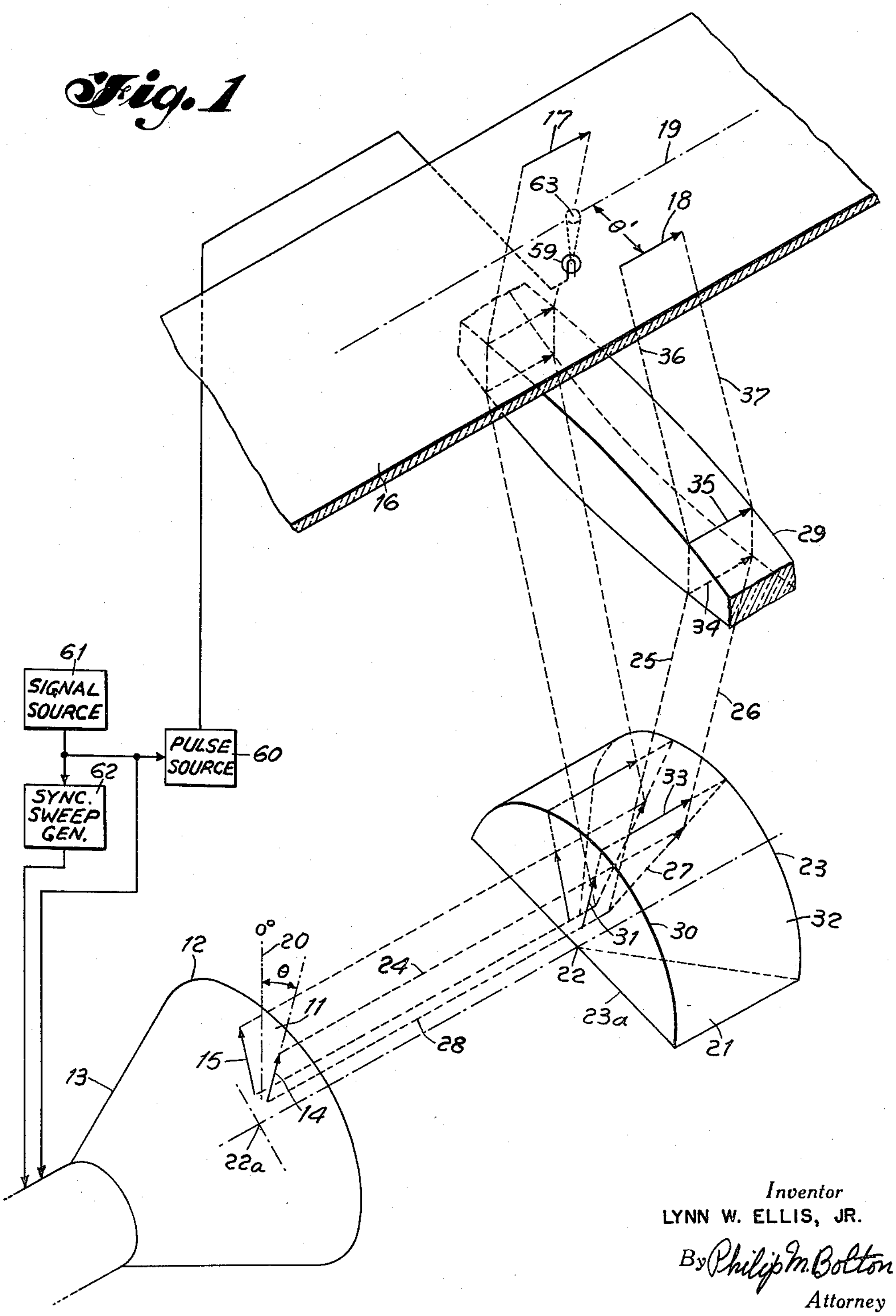
FIG. 1 is a perspective schematic view of an arrangement in which a radial display on a cathode ray tube is recorded on a film as straight lines laterally deflected from a center line.

Referring specifically to FIG. 1, there is a radial display 11 appearing on the face 12 of the cathode ray tube 13. FIG. 1 shows the cathode ray tube looking from the rear of the face. The radially displayed information energy as provided by the lines of light 14 and 15 is transformed and directed to the film 16 whereat it appears as recorded in the form of substantially parallel lines 17 and 18 each of whose lateral deflection from line 19 is proportional to the corresponding angle $\theta$ that lines 14 and 15 respectively lie from the zero degree line 20.

To effect this transformation, there is provided a prism 21 which is one half of a right circular cylinder from which there has been cut a right circular cone. The utilized half of said cone is disposed such that its apex 22 points toward the cathode ray tube face 12 and a line projected therefrom would meet the midpoint 22*a* of the radial display 11. The cone base 23 lies in a plane parallel to the cathode ray tube face 12 and the base 23*a* of the prism 21 lies in a plane which is perpendicular to the cathode ray tube face and parallel to the line which connects the 90° point and the 270° point on the cathode ray tube face 12. The prism effects the abovementioned transformation by reflecting the light from the cathode ray tube in a plane which forms the same angle with a reference position of the radial display as does the informational source of light. Considering the light transmitted from line 14, the prism 21 reflects this light in a plane which can be identified by the line 14, dashed line 24, dashed line 25, dashed line 26, arrow line 27, and dashed line 28. This plane forms the same angle $\theta$ with the zero degree line 20 as does the source of light, line 14. In a like manner, the light from line 15 is reflected in a plane which is the counterpart of the plane identified above and which forms the same angle with the zero degree line 20 as does the source of light, line 15.

In order to facilitate the operation, there is provided a light collector means such as the lens 29 which directs the light rays toward the film 16 which has a relatively small area. The system could operate without the light collector means if there is provided a relatively wide recording means, or in the extreme, films could even be shaped to surround the reflection means and capture all of the light rays emitting from a 360° reflecting means.

By way of illustration, let the path of the light rays from line 14 be noted. The light rays from line 14 travel along a path identified by the dashed lines 24 and 28 and strike the prism face 30 as shown by the arrow 31. The light rays enter the prism and pass to the conical surface 32 where they strike the surface as shown by the dashed arrow 27. The light rays are reflected from the surface 32 along a path identified by the dashed lines 25 and 26 leaving the prism from a position shown by the arrow 33. The light rays continue on to strike lens 29 in a position shown by the dashed arrow 34. It will be clearly noted now that the light energy has been reflected in a plane as mentioned above which can be identified by the dashed lines 24, 25, 26, dashed arrow 27 and dashed line 28 and this plane forms the same angle $\theta$ with the line 20 as did the line 14 of the radial display.

The light rays having entered the lens 29 in a position 34 pass through the lens to the position shown by arrow 35 and are directed therefrom along the path identified by the dashed lines 36 and 37 to the film 16 to be recorded as a parallel line 18. It is obvious that the lateral deflection $\theta'$ shown on film 16 is proportional to the angle $\theta$ shown on the radial display 11. In a like manner, the light energy from line 15 is transformed to be recorded as the line 17 on the film 16.

The extent of the cathode ray tube face area that a 360° radial display can assume is limited by the difficulty of collecting and directing the light from the reflection means to the relatively limited area of the recording means. As shown in the embodiment of FIG. 1, the lens 29 is capable of collecting light for approximately a 120° circumference of the cathode ray tube and it follows that a 360° radial display would have to appear on the cathode ray tube in a 120° area. The condensing of the 360° display to the 120° area is an obvious engineering procedure which, for instance, might be accomplished by having three deflection coils such as those provided in PPI (radar) equipment and having only one of the coils operative over the desired 120° circumference and further having the operative coil geared to travel over this 120° circumference while a rotating antenna traveled through 360°.

Figure 2:
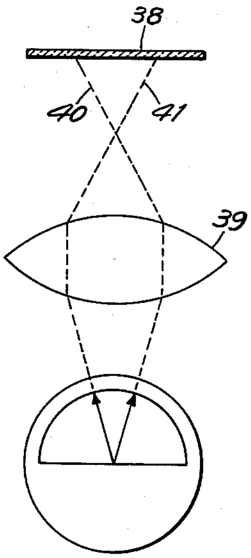
FIG. 2 is a schematic elevation front view of an arrangement similar to that shown in FIG. 1 with a slight variation.

In FIG. 2 there is shown a schematic elevation front view of an arrangement similar to that shown in FIG. 1. The film 38 of FIG. 2 is held at a relatively higher position from the lens 39 than was the film 16 in FIG. 1. The difference of the elevation of the film from the lens causes the light rays to cross and assume the positions shown by lines 40 and 41 of FIG. 2.

Figures 3, 4:
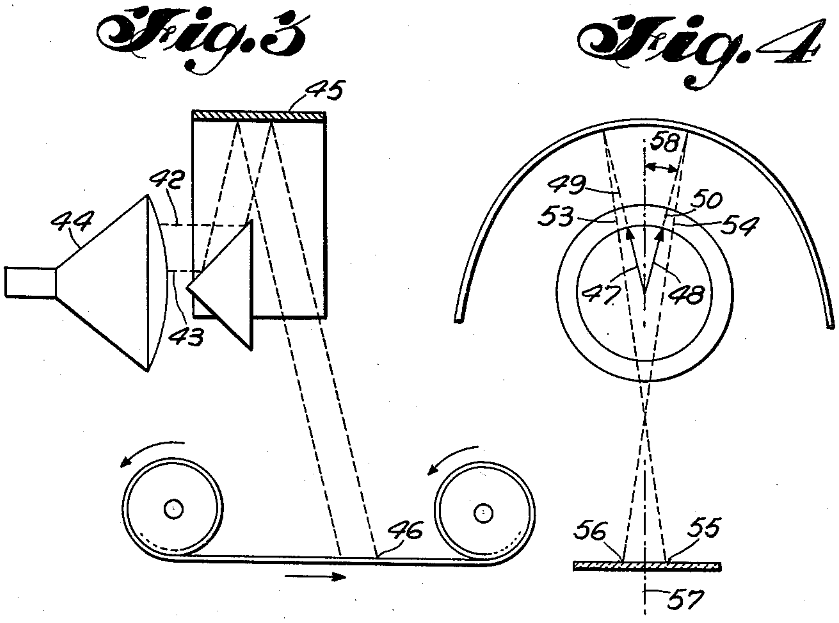
FIG. 3 is a side elevational view partly in section of a modification of the arrangement of FIG. 1 in which the recording of a radial display from a cathode ray tube utilizes a reflecting mirror.
FIG. 4 is an end elevation view partly in section of the arrangement shown in FIG. 3.

In FIG. 3 there is shown an arrangement wherein the reflecting means is a right circular conical mirror instead of a prism with a right circular cone cut therefrom. The light rays shown by the lines 42 and 43 will leave the cathode ray tube 44 and travel along a path as indicated to be reflected from the elliptical mirror 45 to be recorded on the continuously moving film 46. In order to gather the light rays for purposes of concentrating them in the area of the film, the elliptical mirror shown at 45 plays a role in this arrangement similar to the role played by lens 29 in FIG. 1.

In FIG. 4 there is shown a front view of an arrangement similar to the arrangement of FIG. 3. The lines 47 and 48 are analogous to the lines 14 and 15 of FIG. 1. The light rays from the lines 47 and 48 respectively follow the dotted lines 49 and 50 as shown to be respectively reflected at points 51 and 52, travel along lines 53 and 54 and effect a recording of lines 47 and 48 on a film at 55 and 56. The lateral deflection of the recorded line at 56 from the midpoint 57 is representative of the angle 58.

The extent of the radial display on the cathode ray tube in an arrangement as shown in FIG. 1 is limited by the difficulty of directing the light by collector means such as lens 29. If lens 29 were designed so as to collect all the light rays being reflected from the prism for a full 180°, then a 360° radial display would be concentrated on the cathode ray tube face in a 180° area to make the system operative. It follows that if the lens 29 were only capable of collecting rays emitted from 135° of the prism conical surface, then a 360° radial display would appear on the cathode ray tube face in a 135° area. The elliptical mirrors 42 and 42*a* of FIG. 3 and FIG. 4 readily allow for 180° collection of the reflected rays. It is obvious that by proper engineering sufficient lens or ray collecting devices might be placed around a 360° display, appearing on a cathode ray tube, or additional recording mediums could be added and properly disposed to permit the 360° display to appear on the cathode ray tube face and operate without concentration into a smaller area.

When viewing the final recording or film such as 16 of FIG. 1, it is apparent that if the user were interested in the length of the indications or lines such as 17 or 18, for instance, as a measurement of intensity, it might be necessary to provide some additional means to the system to identify the beginning of a line recorded such as 17 or 18, especially, if the same angle or a relatively close angle for successive lines is repeated. If the same angle or a relatively close angle were repeated at intervals during which the film traveled a distance no greater than the length of a line 17, there might appear, instead of separate lines, such as shown by 17 and 18, a continuous line. There are many solutions to this problem of marking the beginning of a line or effectively identifying the length of a line. For instance, since the indications on the cathode ray tube only occur when the system receives intelligence, the intelligence signal may be used to also operate a marker device. In other words, a device coupled to be triggered under control of the intelligence signal passing a narrow beam directly under line 19 of the film in FIG. 1 and located opposite the leading edge of the lens 29, would mark the film at the center point indicating the beginning of the line.

This arrangement is shown in FIG. 1. The flashing device 59 is coupled to the pulse generator 60. When a signal of sufficient amplitude to warrant an indication on the cathode ray tube face 12 is received at, or transmitted from, the signal source 61, the signal is simultaneously passed to the pulse generator 60, the synchronized sweep generator 62 and the cathode ray tube 13. The signal triggers a pulse at 60 which in turn causes a flashing device 59 to send a beam of light to the film 16. The beam of light strikes the film and causes a spot such as 63 to mark the beginning or reference point of the indication, on the film. Another solution would follow if the film is moved at a speed equal to $$\frac{r}{\Delta t}$$

where $r$ is > the maximum possible length of the line on the record which in turn is dependent on the radius of the display and the lens such as 29 in the optical system, and $\Delta t$ is < the time between the flashes appearing on the cathode ray tube.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system for continually recording a varying radial display wherein the radian angle of the displayed information is represented on the record by a lateral deflection of the recorded information from a reference position on the record comprising a cathode ray tube on whose face there appears a varying radial display, a prism means disposed to receive the light rays from said cathode ray tube, said prism being characterized in that it is a right circular cylinder whose radius is equal to its length and further characterized in that there is removed therefrom a right circular cone, said prism disposed such that the apex of said cone faces said cathode ray tube face and the base of said cone lies in a plane parallel to said cathode ray tube face such that the incident light rays passed to said prism are reflected in a plane which forms the same radian angle with the center of the radial display as did the particular part of said display from whence said light rays were emitted, means disposed adjacent to said prism for performing a refraction operation on said light rays and a continuously running light sensitive film disposed adjacent to said lens for receiving and recording said light rays.

2. A system for continually recording a varying radial display according to claim 1, wherein there is further included a light beam flashing device disposed adjacent said light sensitive film, a pulse generator means coupled to said light beam flashing device, a signal source means, a synchronous sweep generator device, first circuitry means coupling the output of said signal source device to beam deflection means of said cathode ray tube and the input of said synchronous sweep generator device, the output of said synchronous sweep generator device coupled to beam deflection means of said cathode ray tube, and second circuitry means coupling the output of said signal source means to said pulse generator means to cause the light beam flashing device to throw a beam of light on said sensitive film at such time as the deflection means of said cathode ray tube causes an indication to appear on the face thereof.

3. A system for continually recording a varying radial display wherein the radian angle of the display information is represented on the record by a lateral deflection of the recorded information from a reference position on the record comprising a cathode ray tube upon whose face there appears a varying radial display, a right circular conical reflecting mirror whose conical surface has reflecting properties, said reflecting mirror disposed such that the apex of said cone faces said cathode ray tube face and the base of said cone lies in the plane parallel to the face of said cathode ray tube face to reflect the incident light rays thereto in a plane which forms the same radian angle with the center point of said radial display as did the particular bit of said display from whence said light rays were emitted, an elliptical mirror disposed adjacent to said right conical mirror to receive and effect a second reflection of said reflected light rays, and a continuously moving light sensitive film disposed adjacent said elliptical mirror for receiving said light rays on the occasion of said second reflection for recording thereof.

4. A system for continually recording a varying radial display wherein the radian angle of the displayed information is represented on the recording by a lateral deflection of the recorded information from a reference position, comprising a cathode ray tube on whose face there appears a varying radial display, a prism means disposed to receive the light rays from said cathode ray tube, said prism being characterized in that it is a right circular cylinder and characterized in that there is removed therefrom a right circular cone to provide a reflecting surface in the shape of said cone, said prism disposed such that the apex of said cone faces said cathode ray tube face and is located over the center of the radial display and the base of said cone lies in a plane parallel to said cathode ray tube face such that the incident light rays passed to said prism are reflected in a plane which forms the same radian angle with the center of the radial display as did the particular part of said display from whence said light rays were emitted, and a light sensitive film for receiving and recording said light rays.

5. A system for continually recording a varying radial display wherein the radian angle of the display information is represented on the recording by a lateral deflection of the recorded information from a reference position, comprising a cathode ray tube upon whose face there appears a varying radial display, a right circular conical reflecting mirror, said reflecting mirror disposed such that the apex of said cone overlies the center of said cathode ray tube face and the base of said cone lies in the plane parallel to the face of said cathode ray tube to reflect the incident light ray thereto in a plane which forms the same radian angle with the center point of said radial display as did the particular bit of said display from whence said light rays were emitted, and a continuously moving light sensitive film disposed adjacent said mirror.

References Cited in the file of this patent

UNITED STATES PATENTS

| | | |
|---|---|---|
| 2,244,235 | Ayres | June 3, 1941 |
| 2,299,682 | Conant | Oct. 20, 1942 |
| 2,586,643 | Garlow | Feb. 19, 1952 |
| 2,779,819 | Graham | Jan. 29, 1957 |
| 2,894,259 | Korn et al. | July 7, 1959 |

FOREIGN PATENTS

| | | |
|---|---|---|
| 670,960 | Great Britain | Apr. 30, 1952 |